(12) United States Patent
Vaughan et al.

(10) Patent No.: US 7,495,816 B2
(45) Date of Patent: Feb. 24, 2009

(54) DIFFRACTION-BASED PULSE SHAPING WITH A 2D OPTICAL MODULATOR

(75) Inventors: Joshua Vaughan, Cambridge, MA (US); Thomas Hornung, Medford, MA (US); Thomas Feurer, Bern (CH); Keith A. Nelson, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 103 days.

(21) Appl. No.: 11/186,735

(22) Filed: Jul. 21, 2005

(65) Prior Publication Data

US 2006/0017999 A1    Jan. 26, 2006

Related U.S. Application Data

(60) Provisional application No. 60/590,600, filed on Jul. 23, 2004.

(51) Int. Cl.
  *G02B 26/00* (2006.01)
(52) U.S. Cl. .................... 359/291; 359/563; 359/238; 359/276; 359/279
(58) Field of Classification Search ........... 359/291, 359/563
See application file for complete search history.

(56) References Cited

U.S. PATENT DOCUMENTS 5,100,234 A * 3/1992 Ishibashi et al. ............ 356/490
5,682,262 A   10/1997 Wefers et al.
5,719,650 A    2/1998 Wefers et al.
5,838,433 A * 11/1998 Hagiwara ................... 356/364
6,479,822 B1 * 11/2002 Nelson et al. ............. 250/341.1
6,654,521 B2 * 11/2003 Sheng et al. ................. 385/37

OTHER PUBLICATIONS

Vaughan, J.C., Hornung, T., Feurer, T. and Nelson, K.A., "Diffraction-based femtosecond pulse shaping with a two-dimensional spatial light modulator", *Optics Letters* 30, 323-325 (2005).

Hacker, M., Stobrawa, G., Sauerbrey, R., Buckup, T., Motzkus, M., Wildenhain, M. and Gehner, A., "Micromirror SLM for femtosecond pulse shaping in the ultraviolet", *Applied Physics B* 76, 711-714 (2003).

Hornung, T., Vaughan, J.C., Feurer, T. and Nelson, K.A., "Degenerate four-wave mixing spectroscopy based on two dimensional femtosecond pulse shaping", *Optics Letters*, 29, 2052-2054 (2004).

(Continued)

*Primary Examiner*—Jessica T Stultz
(74) *Attorney, Agent, or Firm*—Fish & Richardson P.C.

(57) ABSTRACT

Disclosed is a method including: (i) dispersing frequency components of an input EM waveform along a first direction with each frequency component spatially extended along a second direction different from the first direction; (ii) setting an amplitude for an output portion of each of the spatially extended frequency components; and (iii) combining the output portions from the different frequency components to produce a temporally shaped output EM waveform, wherein setting the amplitude of each output portion comprises diffracting a corresponding input portion for the spatially extended frequency component along the second direction into different diffraction orders, wherein the combined output portions correspond to a common diffraction order. A system for performing the method is also disclosed.

32 Claims, 5 Drawing Sheets

OTHER PUBLICATIONS

Wefers, M.M. and Nelson, K.A., "Analysis of programmable ultrashort waveform generation using liquid-crystal spatial light modulators", *Journal of the Optical Society of America B* 12, 1343-1362 (1995).

Weiner, A.M., Leaird, D.E., Patel, J.S. and Wullert, J.R., "Programmable Shaping of Femtosecond Optical Pulses by Use of 128-Element Liquid Crystal Phase Modulator", *IEEE Journal of Quantum Electronics* 28, 908-920 (1992).

Vaughan, J.C., Feurer, T. and Nelson, K.A., "Automated two-dimensional femtosecond pulse shaping", *Journal of the Optical Society of America B* 19, 2489-2495 (2002).

Weiner, A.M., "Femtosecond pulse shaping using spatial light modulators", *Review of Scientific Instruments* 71, 1929-1960 (2000).

Wefers, M.M. and Nelson, K.A., "Generation of high-fidelity programmable ultrafast optical waveforms", *Optics Letters* 20, 1047-1049 (1995).

Wefers, M.M., Kawashima, H. and Nelson, K.A., "Automated multidimensional coherent optical spectroscopy with multiple phase-related femtosecond pulses", *Journal of Chemical Physics* 102, 9133-9136 (1995).

Dudovich, N., Oron, D. and Silberberg, Y., "Single-pulse coherently controlled nonlinear Raman spectroscopy and microscopy", *Nature* 418, 512-514 (2002).

Assion, A., Baumert, T., Bergt, M., Brixner, T., Kiefer, B., Seyfried, V., Strehle, M. and Gerber, G., "Control of Chemical Reactions by Feedback-Optimized Phase-Shaped Femtosecond Laser Pulses", *Science* 282, 919-922 (1998).

Levis, R.J., Menkir, G.M. and Rabitz, H., "Selective Bond Dissociation and Rearrangement with Optimally Tailored, Strong-Field Laser Pulses", *Science* 292, 709-713 (2001).

Sardesai, H.P., Chang, C.-C. and Weiner, A.M., "A Femtosecond Code-Division Multiple-Access Communication System Test Bed", *Journal of Lightwave Technology* 16, 1953-1964 (1998).

Witte, T., Zeidler, D., Proch, D., Kompa, K.L. and Motzkus, M., "Programmable amplitude- and phase-modulated femtosecond laser pulses in the mid-infrared", *Optics Letters* 27, 131-133 (2002).

Weiner, A.M., Heritage, J.P. and Thurston, R.N., "Synthesis of phase-coherent, picosecond optical square pulses", *Optics Letters* 11, 153-155 (1986).

* cited by examiner

DIFFRACTION-BASED PULSE SHAPING WITH A 2D OPTICAL MODULATOR

CROSS-REFERENCE TO RELATED APPLICATIONS

This application claims priority to U.S. Application Ser. No. 60/590,600 entitled "Diffraction-Based Pulse Shaping with a 2D Spatial Light Modulator", filed on Jul. 23, 2004, the contents of which are incorporated herein by reference.

STATEMENT AS TO FEDERALLY SPONSORED RESEARCH

This invention was made with government support under NSF CHE-0212375 and ARO DAAD10-01-1-0647. The Government has certain rights in this invention.

TECHNICAL FIELD

This invention relates to techniques for shaping optical waveforms, for example, spatiotemporal shaping of ultrafast optical waveforms.

BACKGROUND

Femtosecond pulse shaping has found widespread use for many scientific and industrial applications since its inception nearly 20 years ago. The development of a commercial apparatus for computer-controlled, high-fidelity phase and amplitude pulse shaping has greatly facilitated the application of pulse shaping methods to diverse problems such as optical characterization of materials, time-division multiplexing in signaling systems, laser microscopy, and optical control of matter. Transformation of a single input optical pulse into one or more output pulses by manipulating the spectral properties of the input pulse in controlled fashion is widely achieved through the use of a liquid crystal spatial light modulator array of the type manufactured by, for example, Cambridge Research & Instrumentation (Woburn, Mass.). Such a device includes two one-dimensional liquid crystal spatial light modulators, each oriented in a plane transverse to the light propagation direction. The modulators are transmissive for optical wavelengths in the range 400-1600 nm, and can be refreshed at a rate of roughly 10-100 ms, affording the operator a means of adjusting either the phase or, in combination with additional optics, the amplitude of an input pulse with each one-dimensional spatial light modulator. In order to shape both the amplitude and phase of an optical waveform, both one-dimensional spatial light modulators must be aligned and operated in tandem.

Spatial light modulator (SLM) arrays comprise discrete, addressable pixel elements. The waveforms produced following standard phase and/or amplitude shaping in such arrays often contain replicas due to finite sampling effects. In addition, the utility of a pulse shaper based on a spatial light modulator array is only fully exploited if each pixel element of the SLM is capable of contributing a full $2\pi$ phase retardation at the wavelength of the light which impinges upon it.

Techniques for shaping optical waveforms are disclosed in the following patents: U.S. Pat. No. 5,719,650 entitled "HIGH FIDELITY SPATIAL LIGHT MODULATOR" and U.S. Pat. No. 5,682,262 entitled "METHOD AND DEVICE FOR GENERATING SPATIALLY AND TEMPORALLY SHAPED OPTICAL WAVEFORMS," the contents of which are incorporated by reference herein.

SUMMARY

We disclose a method and apparatus for diffraction-based phase and amplitude shaping of optical waveforms, such as femtosecond laser pulses, using a two-dimensional light modulator (for example, a mask having patterns spanning two dimensions). The method produces high-quality phase- and amplitude-shaped laser pulses, allows for relaxed demands on the capabilities of 2D modulators used for pulse shaping, and allows for multiplexed outputs suitable for use in various applications.

In general, in one aspect, the invention features a method comprising: (i) dispersing frequency components of an input electromagnetic (EM) waveform along a first direction with each frequency component spatially extended along a second direction different from the first direction; (ii) setting an amplitude for an output portion for each of the spatially extended frequency components; and (iii) combining the output portions from the different frequency components to produce a spatiotemporally shaped output EM waveform. Setting the amplitude for each output portion includes diffracting a corresponding input portion of each spatially extended frequency components into different diffraction orders, wherein the combined output portions correspond to a common diffraction order.

Embodiments of the method may include any of the following features.

The method may further include setting the phase of each output portions.

The different diffraction orders may include a zero diffraction order and at least one non-zero diffraction order. The output portions may correspond to one of the non-zero diffraction orders. Alternatively, the output portions may correspond to the zero-diffraction order. The method may further include blocking diffraction orders that do not correspond to the output portions.

The method may further include setting an amplitude for one or more additional output portions for each of the spatially extended frequency components, and combining all of the output portions to cause the output EM waveform to be temporally and spatially shaped. For example, all of output portions may be combined to produce the output EM waveform with a spatial profile corresponding to a spatial profile of the output portions along the second direction. Alternatively, for example, all of the output portions may be combined to produce the output EM waveform with a spatial profile corresponding to a Fourier transform of a spatial profile of the output portions along the second direction.

Patterns on a mask may be used for the diffracting. For example, the mask may comprise an active area that imparts only phase modulation.

The patterns on the mask may be fixed or programmable. For example, programmable masks include a liquid crystal spatial light modulator, a MEMS device, and a deformable mirror array. The mask may diffract light in a reflection mode or in a transmission mode.

The mask may include independent phase retarding elements extending along the first and second directions. For example, multiple subsets along the second direction of the phase retarding elements may be used to form the patterns that diffract the input portions. In some embodiments, each subset forms a sawtooth diffraction grating pattern. Other diffraction patterns such as echelle-like, holographic, and others, may also be used. In some embodiments, the phase retarding elements are only capable of phase retardation over a range less than $2\pi$.

The input EM waveform may include a coherent bandwidth greater than 1 THz, or even, greater than 10 THz. The output EM waveform may include spatially separated beams each comprising one or more temporal features shorter than 1 picosecond (ps), or even, shorter than 200 femtoseconds (fs).

In general, in another aspect, the invention features an apparatus including: (i) a mask; (ii) input optics positioned to disperse frequency components of an input EM waveform along a first direction of the mask with each frequency component spatially extended along a second direction of the mask different from the first direction; and (iii) output optics positioned to combine output portions from the mask to produce a spatiotemporally shaped output EM waveform. The mask is configured to set an amplitude of each output portion by diffracting a corresponding input portion of each spatially extended frequency component along the second direction into different diffraction orders, wherein the output portions correspond to a common one of the diffraction orders.

Embodiments of the apparatus may include any of the following features.

The input optics and the output optics may share one or more common elements.

The mask may be further configured to set the phases of the output portions of each spatially extended frequency component.

The different diffraction orders may include a zero diffraction order and at least one non-zero diffraction order. For example, the output portions may correspond to one of the non-zero diffraction orders. Alternatively, the output portions may correspond to the zero diffraction order. The apparatus may further include a stop for blocking diffraction orders not corresponding to the output portions.

The mask may be further configured to set an amplitude for one or more additional output portions for each of the spatially extended frequency components, and the output optics may be configured to combine all of the output portions to cause the output EM waveform to be temporally and spatially shaped. For example, the output optics may be configured to combine all of the output portions to produce an output EM waveform with a spatial profile corresponding to a spatial profile of the output portions along the second direction. Alternatively, the output optics may be configured to combine all of the output portions to produce an output EM waveform with a spatial profile corresponding to a Fourier transform of a spatial profile of the output portions along the second direction.

The mask may be configured to diffract in a reflection mode or in a transmission mode. The mask may be configured to have diffractive patterns based on phase-only modulation. The diffractive patterns on the mask may be fixed or programmable.

For a programmable mask, the apparatus may further include an electronic controller coupled to the mask for programming the diffractive patterns. For example, the mask may be a liquid crystal spatial light modulator, a MEMS device, or a deformable mirror.

The mask may include independent phase retarding elements extending along the first and second directions. For example, multiple subsets along the second direction of the phase retarding elements may be configured to form patterns that diffract the input portions. In some embodiments, the phase retarding elements are only capable of phase retardation over a range less than $2\pi$.

The apparatus may further include a source providing the input EM waveform, wherein the input EM waveform comprises a coherent bandwidth greater than 1 THz, or even, greater than 10 THz. The mask and output optics may be configured to cause the output EM waveform to include spatially separated beams each including one or more temporal features shorter than 1 ps, or even, shorter than 200 fs.

Advantages of embodiments of the invention may include any of the following.

Phase and amplitude pulse shaping can be achieved with a single mask capable only of phase retardation (either by reflection or transmission). Furthermore, phase retardation imparted to selected frequency components, or sub-portions thereof, can span a full $2\pi$ range even if the full phase retardation range of specific elements of the mask is less than $2\pi$.

The technique can be used to temporally and/or spatially shape optical waveforms, including ultrafast optical waveforms having features shorter than about 1 ps, or even shorter than 200 fs. For example, an input ultrafast pulse can be shaped into an array of pulses spatially and temporally separated from one another by selectable amounts corresponding to the mask patterns. The spatial and temporal shaping can be made programmable through the use of a programmable mask, such as a liquid crystal spatial light modulator, MEMS device, or a deformable mirror. When a MEMS device or deformable mirror is used, the optical damage threshold and spectral range of the mask may be extended, and the mask may be operated at higher refresh rates for time-dependent shaping of input waveforms. The technique may also suppress unwanted temporal replicas common in existing pulse shaping methods when combined with spatial filtering of the output waveform.

Unless otherwise defined, all technical and scientific terms used herein have the same meaning as commonly understood by one of ordinary skill in the art to which this invention belongs.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
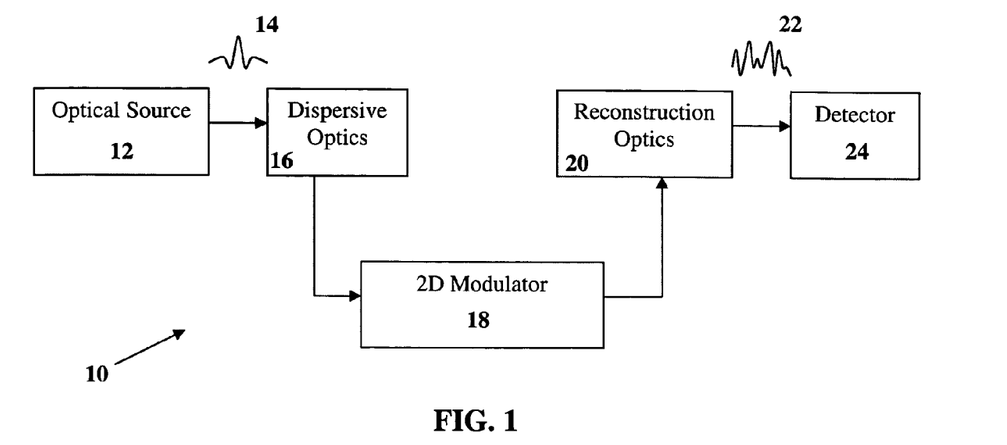
FIG. 1 is a schematic of a two-dimensional diffractive pulse shaping system in which both the amplitude and phase of an input waveform are adjusted in controlled fashion.

FIG. 1 is a schematic of a two-dimensional diffraction-based spatiotemporal pulse shaping apparatus 10. An input waveform 14 derived from optical source 12 propagates through one or more dispersive optical elements 16, a two-dimensional modulator 18, and one or more optical elements 20 that transform the waveform following the modulator into its real-space image or its Fourier transform representation. By interacting with modulator 18, the phase and/or amplitude properties of input waveform 14 are changed to produce output waveform 22.

Output waveform 22 may be measured by means of cross-correlation with a reference waveform, frequency-resolved optical gating, spectral shearing interferometry, or other suitable means known to one skilled in the art, and embodied in detector 24. Alternatively, output waveform 22 may be employed directly in another application.

Optical source 12 is any source of electromagnetic radiation which produces an input waveform suitable for shaping by the apparatus 10. Source 12 may, for example, be a laser oscillator or amplified laser system. The wavelength of input waveform 14 in the preferred embodiment to be described may fall within the range of optical frequencies spanning the ultraviolet to the infrared regions of the EM spectrum, but it is understood that operation of the 2D diffraction-based pulse shaping apparatus 10 and the methods of operation are not restricted to this region of the spectrum, and operation of the device in other regions of the spectrum is analogous.

Modulator 18 includes a two-dimensional mask having an active area that modulates the phase and/or amplitude properties of the input waveform. For the purpose of this disclosure, a mask is defined as a device operating in either transmission or reflection mode, that modifies the phase and/or amplitude of an incident EM field by means of one or more properties that vary across the two-dimensional surface of the mask. Properties that vary may include, for example, surface displacement of the mask, orientation of liquid crystal molecules in the mask, mask thickness, etc. The mask may include a liquid crystalline pixel array, a MEMS device, a deformable mirror, a fixed solid structure such as a patterned glass substrate, or any other similar device which modulates the incident EM field in two dimensions.

The mask pattern may be static or programmable. Where the mask pattern is programmable, modulator 18 may also include an electronic controller coupled to the mask for programming the mask patterns.

Figure 2A:
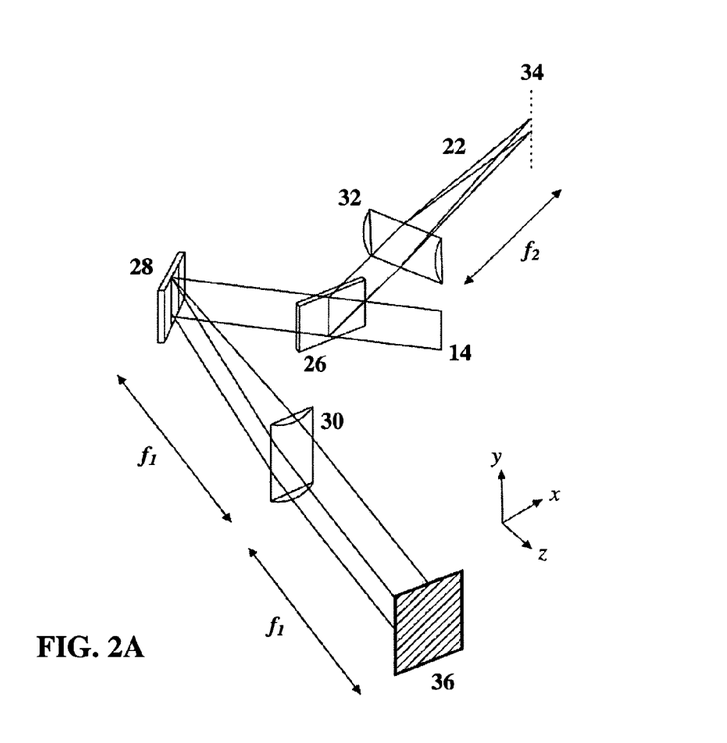
FIG. 2A is an isometric view of a reflection-mode apparatus for diffraction-based two-dimensional spatiotemporal shaping of optical waveforms.

Referring to FIG. 2A, in a preferred embodiment, a reflective mask is used to modify the phase properties of input waveform 14 in order to produce output waveform 22. In this reflective geometry, the output waveform 22 retraces a portion of the path of the input waveform 14. The input waveform 14 is spatially dispersed along the y direction to an extent such that its vertical breadth in the y direction is only slightly smaller than the extent of the active area of the mask in the y direction.

In the presently described embodiment, immediately prior to passing through beamsplitter 26, input waveform 14 includes a single input pulse generated in a laser oscillator or amplified laser system, wherein the pulse further includes a set of phase-coherent, spatially overlapped spectral frequencies. In other embodiments, input waveform 14 may include more than one pulse, wherein the multiple pulses include a set of phase-coherent, spatially overlapped spectral frequencies. In further embodiments, input waveform 14 may include one or more electromagnetic fields, wherein the one or more fields include a set of spectral frequencies which may be phase coherent, or may not be phase coherent.

Figure 2B:
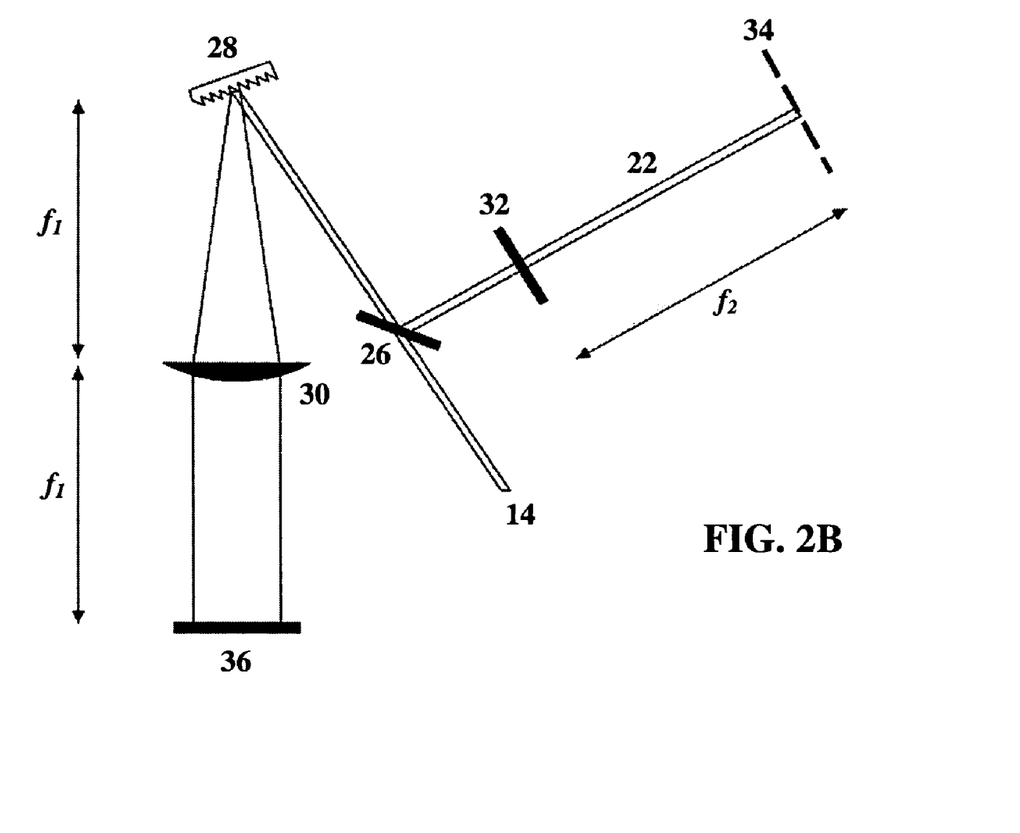
FIG. 2B is a top view of the reflection-mode pulse shaping apparatus.

With reference to FIG. 2B, the input pulse passes through beamsplitter 26 and impinges on diffraction grating 28 which is oriented such that the direction of the grooves is along the y axis. The grating may be a ruled grating, or the grating may be manufactured holographically, or by any other appropriate means. The waveform 14 is diffracted from grating 28, dispersing its spectral frequencies along the spatial x axis. Each frequency component of the input pulse is dispersed to a particular spatial location along the x axis in a plane transverse to the propagation direction of the waveform.

Cylindrical lens 30 is placed at a location along the z axis between the diffraction grating 28 and two-dimensional mask 36. The focal length of lens 30 is $f_1$, and the grating 28 and mask 36 are situated such that the grating-lens distance and lens-mask distance are each $f_1$ along the z axis. Cylindrical lens 30 is oriented such that its curved surface lies principally along the x axis. The lens collimates the dispersed spectral frequency components of the input waveform following diffraction from grating 28 and focuses each of these components to a minimum spatial extent in the x dimension at the surface of the mask 36. The combination of grating 28 and lens 30 maps the frequencies comprising the bandwidth of waveform 14 onto spatial locations along the x dimension of the mask active area, and each individual frequency component extends spatially in the y direction. The position and focal length of lens 30 are chosen such that the spatial extent of all frequency components in the x direction taken together is only slightly less than the active area of the mask 36 along the x axis.

Figure 2C:
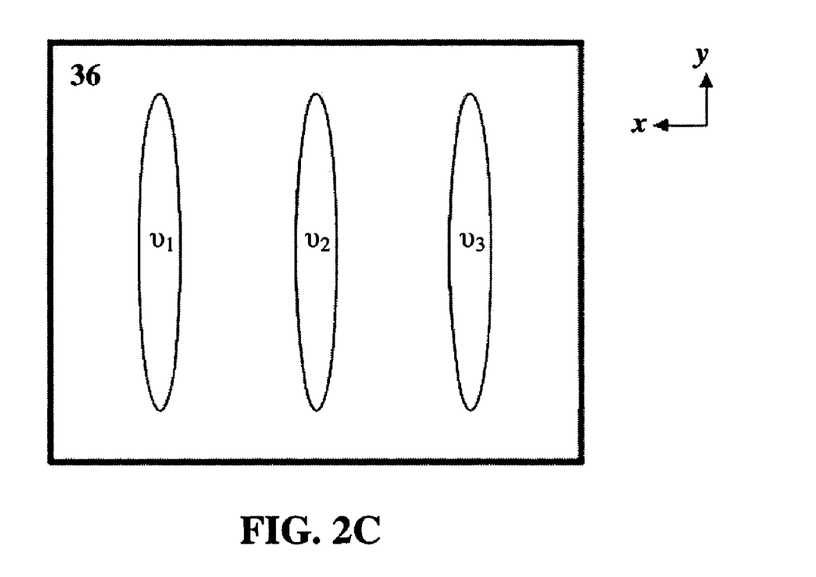
FIG. 2C is a schematic of the two-dimensional mask showing spatially dispersed frequency components of the input waveform.

FIG. 2C shows three separate frequency components $\upsilon_1$, $\upsilon_2$ and $\upsilon_3$ focused to the surface of mask 36. At the surface of the mask, the waveform profile is two-dimensional wherein the frequency components of the input waveform, at any position along the y axis, are dispersed in the spatial x direction. In the present embodiment, the mask 36 is a reflective mask including a series of individual programmable elements, each of which may be adjusted to impart a phase modulation to that portion of the 2D input waveform profile with which it interacts. Each element therefore samples a small subset of the frequencies comprising the bandwidth of the input waveform, where the width of the subset is dependent upon the total bandwidth of the waveform, the properties of diffraction grating 28 and lens 30, and the surface area of the element.

For each programmable element on mask 36, the phase of the subset of frequencies and spatial locations of input waveform light which impinges on that element is modified by electronically addressing the element. Where the element includes a liquid crystal medium, the phase of the input light is modified by adjusting the local electric field across that element, causing rotation of the liquid crystal molecules including that element. Where the element is part of a MEMS device or a deformable mirror, adjustment of the displacement of that element's surface in the direction of an axis orthogonal to the surface produces phase modulation in the corresponding spatio-spectral region of the input waveform.

After reflecting from mask 36, the modified waveform traverses a second set of optics 20 which reconstruct the waveform profile by recombining dispersed frequency components of the waveform into spatially overlapped frequency components. In the present embodiment, the reconstruction optics 20 include cylindrical lens 30, the diffraction grating 28 and the cylindrical lens 32, since the modified waveform retraces a portion of the path of the input waveform upon reflection from mask 36. Cylindrical lens 30 collects the spatially dispersed frequency components of the modified waveform reflected from the mask and transfers the components to a location on the diffraction grating 28, the spatial extent of which is very nearly the same as the spatial extent of the input waveform 14 on the grating 28. On reflection from the grating, the frequency components of the modified waveform are spatially coincident in the x direction, as for input waveform 14. The modified waveform impinges on beamsplitter 26 and the reflected component of the modified beam is retained and passes through cylindrical lens 32.

Cylindrical lens 32 is oriented with its curved dimension lying principally in the y direction. The lens focuses the modified waveform to a focal plane 34 where the distance between the lens 32 and the plane 34 is given by $f_2$, the focal length of lens 32.

In the present embodiment, a periodic diffractive pattern is applied along the vertical direction y of mask 36. The mask functions as a diffraction grating in the y direction, acting upon each of the spatially extended frequency components of input waveform 14. The effect of the diffractive pattern is to produce, after passage through lens 32, multiple replicas of the input beam in the vertical direction y at focal plane 34, corresponding to the zero-order, first-order, and higher-order diffracted beams. The set of frequency components comprising each of the diffracted orders of output waveform 22 may be the same, or may be different.

The output waveform 22 may be spatially filtered at focal plane 34 to allow only the first-order diffracted beam to pass through the plane, or to allow only the zero-order beam to pass, or to allow any combination of the multiple orders to pass.

Lens 32 is typically positioned at a distance $f_2$ from diffraction grating 28, although this is not a requirement for the 2D diffraction-based pulse shaper. The output waveform 22 following lens 32 may be directed into a detector 24 or may be used in another application, such as spectroscopic characterization of a material sample. When a sample is placed at the output plane 34, located at a distance $f_2$ from lens 32 as in FIG. 2B, the sample is located in the Fourier plane of the output waveform and the 2D diffraction-based pulse shaper is operated with Fourier imaging. Alternatively, when a second lens of the same type as lens 32 is placed at a distance $2f_2$ from lens 32 along the propagation axis of output waveform 22, and the sample is placed just beyond the second lens, the waveform spatial profile at the position of grating 28 is imaged onto the surface of the sample. In this configuration, the 2D diffraction-based pulse shaper is operated with shadow imaging, or real-space imaging. These are, however, only particular embodiments of 2D diffraction-based pulse shaping, as a detector or sample may be placed at any location along the propagation axis of output waveform 22, and any number of lenses may be employed as part of the set of reconstruction optics 20.

Figure 2D:
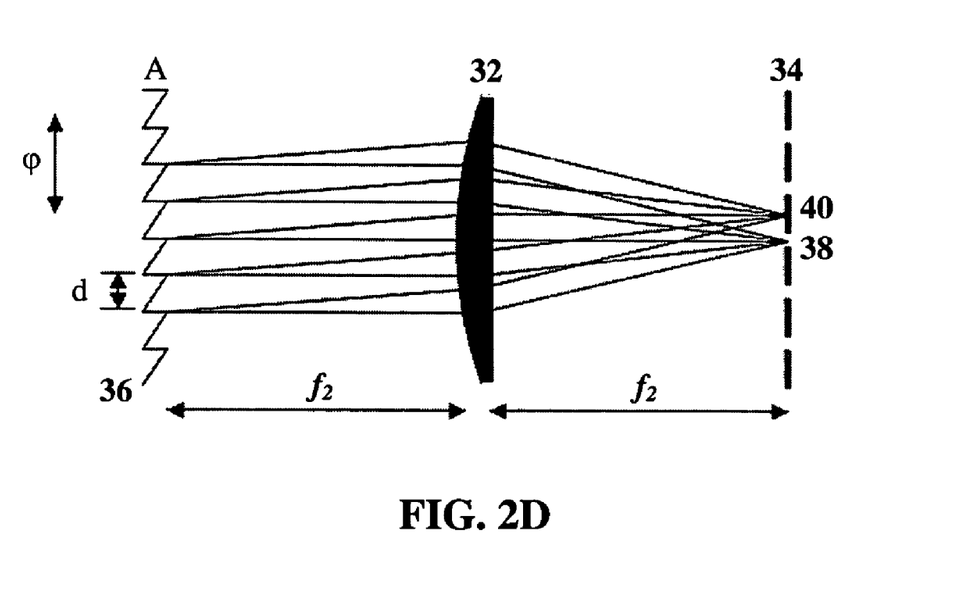
FIG. 2D is a side view of the reflection-mode pulse shaping apparatus.

FIG. 2D is a side view of the present embodiment of the pulse shaper, omitting for clarity lens 30 and beamsplitter 26. Mask 36 is configured to provide, in the vertical y dimension, a periodic sawtooth pattern of amplitude A, period d and spatial phase $\phi$. Incident rays of the waveform are omitted for clarity; only the reflected rays which comprise output waveform 22 are shown. Rays corresponding to different diffracted orders of the output waveform are focused by lens 32 to plane 34. At the focal plane, two focal spots are shown. Beam 38, located in the position of highest symmetry along the axis of the lens, corresponds to the zero-order diffracted beam. The second beam 40, which is displaced from beam 38 in the y direction, corresponds to the first-order diffracted beam. The separation of the first two beam orders, and also higher beam orders, is useful for spatial filtering of the output waveform 22 in order to reduce temporal replica features.

As for a blazed diffraction grating, the direction of the first-order diffracted light at a given wavelength is determined by the period of the sawtooth phase function imparted by mask 36, which is typically (although not necessarily) constant for all frequency components within the laser bandwidth. The amplitude A and phase $\phi$ of the sawtooth may be varied for each spectral component in order to modulate the amplitude and phase, respectively, of the light diffracted into first-order and higher-order beams. A spatial aperture may be used at a point along the propagation axis of waveform 22, for example at the position of plane 34, to mask out all but the first-order diffracted light.

Beamsplitter 26 includes any optical element or combination of elements which separates the paths of input waveform 14 and output waveform 22. The beamsplitter may, for example, include a partially-reflecting metallic or dielectric coating on a substrate. Alternatively, in another embodiment which reduces the amount of discarded light, beamsplitter 26 may be replaced with a mirror and the alignment of other optical elements of the pulse shaper 10 adjusted such that input waveform 14 bypasses the mirror, whereas output waveform 22 reflects from the surface of the mirror and passes through lens 32. In other embodiments, beamsplitter 26 may be replaced with an optic containing an aperture, either induced or static, which permits passage of the input waveform 14 and reflects the output waveform 22 in the output direction. For example, beamsplitter 26 may be replaced with a polarizing beamsplitter and a quarter-wave plate, or an electro-optic material, or an acousto-optic material. In further embodiments, for example where a transmissive mask is employed, beamsplitter 26 may be removed altogether.

In embodiments, diffraction grating 28 may be a ruled grating, or an echelle grating, or a holographic grating, or a phase grating, or any other structure containing periodic features suitable for diffracting an input waveform. The grating may be reflective or transmissive. Grating 28 may also be replaced by another dispersive element such as a prism, echelon, or any other element or combination of elements oriented such that the frequency components of the input waveform are dispersed along the first direction of the mask 36.

Cylindrical lens 30 may be composed of any material suitable for making a lens at the wavelength of the input waveform. Lens 30 may be transmissive, or may be a curved mirror acting as a reflecting lens. Lens 30 may be replaced by a system of two or more lenses. Lens 30 or a combination of lenses may be positioned at any location relative to diffraction grating 28 and mask 36 such that the diffracted frequency components of the input waveform are collimated and focused in a first direction at the plane of mask 36. Similarly, cylindrical lens 32 may be composed of any material suitable for lens construction at the wavelength of the input waveform, and may also be transmissive or reflective. Lens 32 may also be replaced by a series of two or more lenses positioned in order to focus output waveform 22 to a focal plane 34. A spatial filter may be employed at focal plane 34 to block one or more diffracted orders of waveform 22. One or more additional lenses may be placed after focal plane 34 in order to correctly image the diffracted beam orders which pass through plane 34.

Mask 36 may be a static mask or a programmable mask. If mask 36 has programmable elements, then modulator 18 may also include an electronic controller and other means for programming the elements. The mask may be a liquid crystal mask, or a MEMS device, or a deformable mirror, or a fixed solid mask such as a patterned glass substrate, or any other similar two-dimensional device that modifies the phase and/or amplitude of an input waveform by means of one or more properties that vary across its two-dimensional surface. The mask may operate in reflection mode or transmission mode.

If the mask has programmable elements, each element may provide a phase retardation of less than $2\pi$ to that portion of the input pulse profile which impinges upon it, or each element may provide a phase retardation of $2\pi$, or even greater than $2\pi$. In the embodiment described, a periodic phase pattern which diffracts an input waveform is applied by the mask in the y direction to the spatially-dispersed frequency components of the input waveform, where each frequency component is extended in the y direction. The phase pattern may be a sawtooth pattern, a square-wave pattern, a sinusoidal pattern, or any other periodic pattern suitable for diffraction.

The phase pattern of the mask may be composed of summations of one or more periodic patterns, and the overall summation may or may not be periodic. More generally, the diffractive mask pattern may be very complex, and may be periodic or may not be periodic.

If mask 36 is operated in transmission mode, then the diffraction-based 2D pulse shaper may include another cylindrical lens and diffraction grating arranged in a mirrored aspect relative to lens 30 and grating 28, wherein mask 36 defines the mirror plane. The additional cylindrical lens may have the same composition and focal length as lens 30, or may be constructed of a different material, or have a different focal length, or both. The additional lens may be reflective or transmissive. The additional lens may include two or more lenses. The additional diffraction grating may be similarly composed and have the same profile as grating 28, or the composition may be different, or the surface profile may be different, or both the composition and profile may be different. The additional grating may be a reflection grating or a transmission grating. The additional grating may include another dispersive element or set of elements, which overlap the spatially-dispersed frequency components of the modified waveform to produce output waveform 22.

Figure 3:
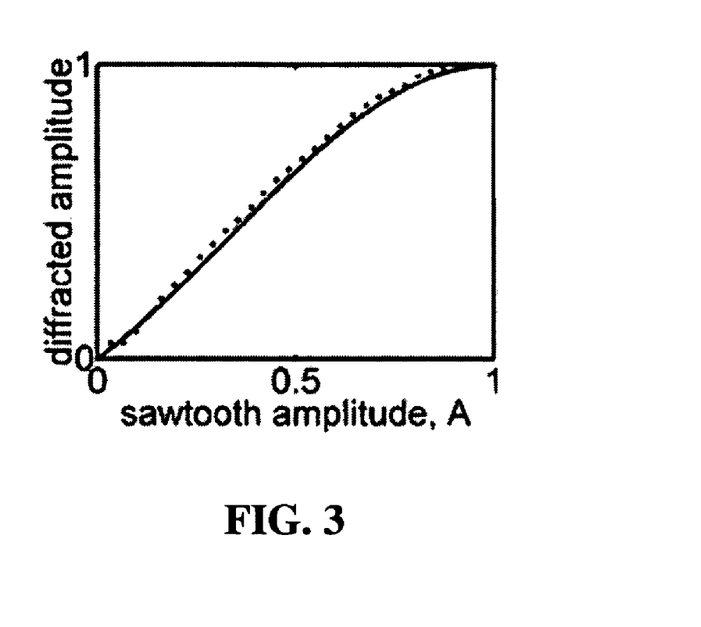
FIG. 3 is a graph showing the amplitude of diffracted light from the diffractive two-dimensional pulse shaper as a function of the modulation depth of the mask grating pattern along the second mask direction, for a sawtooth mask profile.

The phase and amplitude dependence of the diffracted light are easily understood in terms of Fraunhofer diffraction. If the phase modulation introduced by a 2D mask 36 is given by $$\Phi(v, y) = \alpha \left[ \frac{1}{2} + A(v) S_d(\varphi(v), y) \right] \quad (1)$$

then the resulting first-order diffraction at the spatial Fourier plane 34 of lens 32 is calculated as $$E(v) \propto e^{-i\varphi(v)} \text{sinc}\left[\pi - \frac{\alpha}{2} A(v)\right] \quad (2)$$

where $\alpha$ is the maximum phase shift achievable by the mask, $S_d$ is a sawtooth function with period d, phase $\phi$ and amplitude $\pm \frac{1}{2}$, oriented along the vertical dimension y of mask 36, and where the spectral amplitude function $A(v)$ may be varied between zero and unity for any spectral component $v$. From Equation (2) it is clear that the phase of the diffracted light may be controlled by varying the phase, i.e. the vertical position, of the sawtooth function $S_d$, while the amplitude of the diffracted light follows a "sinc" dependence on the amplitude parameter $A(v)$. FIG. 3 is a graph showing the amplitude of diffracted light from the 2D diffraction-based pulse shaper as a function of the modulation depth of the sawtooth diffraction pattern along the vertical y dimension of the mask. The measured diffraction amplitude, in this case for a 2D modulator with $\alpha=2\pi$, is in good agreement with the expected sinc dependence from Equation (2).

Standard two-dimensional pulse shaping methods are only fully exploited if the phase retardation introduced by the modulator includes a delay range of at least $2\pi$ for all wavelengths comprising the input waveform. This condition may be difficult to satisfy for waveforms comprised of, for example, wavelengths in the infrared and microwave region of the electromagnetic spectrum. An important aspect of Equation (2) is that the phase of the diffracted light is independent of $\alpha$, the maximum phase modulation achievable by the mask. Therefore, a 2D mask with $\alpha<2\pi$ can still shift the phase of the diffracted light by up to $2\pi$, although the maximum throughput is less than unity. For example, a 2D mask with a maximum phase shift of $\pi$ in reflection mode would have a corresponding maximum achievable amplitude of sinc $(\pi/2)=0.64$ in a diffraction-based 2D pulse shaper. Thus, the diffraction-based approach allows, for example, direct spatiotemporal pulse shaping in the near- to mid-infrared with 2D MEMS modulators that are commercially available but can only provide a $2\pi$ phase shift for wavelengths up to 900 nm.

Figure 4A:
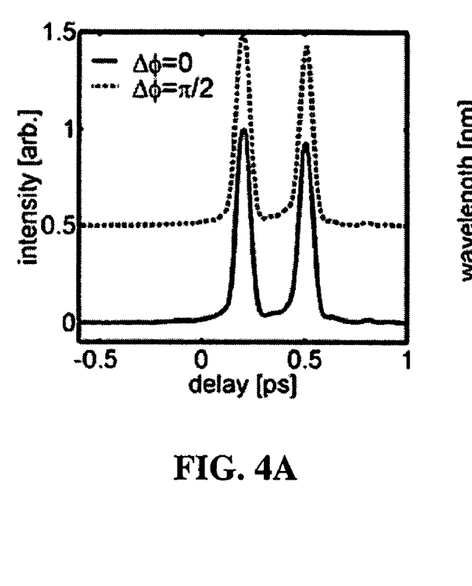
FIG. 4A is a plot of the cross-correlation intensity of an output double pulse waveform generated by applying a linear phase and a cosine-squared amplitude modulation in tandem to an input pulse.

FIG. 4A is a plot of the cross-correlation intensity of an output double pulse waveform measured with reference to an unshaped pulse. In order to create the double pulse, a 3.3 THz cosine-squared amplitude modulation was applied to an unshaped input pulse via modulator 18, in combination with a linear spectral phase of slope 0.35 ps. The temporal pulse locations are in agreement with the expected positions at 0.2 ps and 0.5 ps. The relative phases of the pulses in the double pulse waveform may be inferred by observing the position of the cosine-squared modulation that produces the waveform.

Figure 4B:
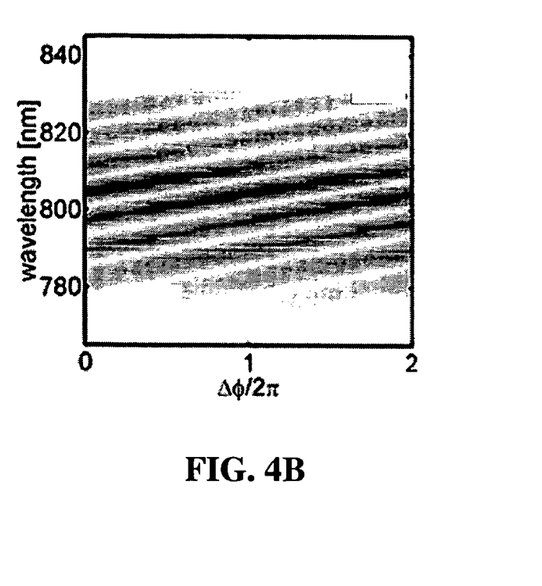
FIG. 4B is a plot of the spectral intensity of a double pulse waveform as a function of the relative phase between the two pulses.

FIG. 4B is a plot of the spectral intensity of the double pulse waveform of FIG. 4A as a function of the relative phase, ($\phi$, between the two pulses. Vertical sections through FIG. 4B for $\phi=0$ and $\phi=\pi/2$ reveal that the fringes in the spectral intensity of the two pulses are shifted by $\pi/2$.

A notable feature of embodiments of the 2D diffraction-based pulse shaper is the suppression of unwanted temporal replica features routinely observed by practitioners skilled in the art. Temporal replica features appear in shaped pulses for a variety of reasons which may be roughly categorized as being either sampling replicas or modulator replicas. Sampling replicas are unwanted temporal features, typically observed at long times, that directly result from sampling considerations and are inherent to any pixelated device, including the mask 36 described in the present embodiment. Modulator replicas are unwanted temporal features, typically observed at shorter times, that arise from effects such as gaps between pixels or from pixel boundaries that are not perfectly step-like.

Since modulators have a limited phase modulation range, phase patterns are typically applied modulo $2\pi$, often producing jumps of approximately $2\pi$ in adjacent pixels. The combination of $2\pi$ phase jumps in adjacent pixels and pixel boundaries that are not perfectly step-like sometimes results in multiple modulator replicas at evenly spaced temporal intervals. These modulator replicas may be eliminated through 2D diffraction-based pulse shaping as described in the present embodiment.

Figure 5A:
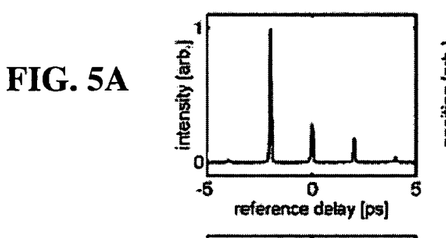
FIGS. 5A-D are plots in one and two dimensions of the cross-correlation intensity as a function of temporal delay for a shaped output waveform and its temporal replicas.

Referring to FIG. 5A, the cross-correlation intensity of a shaped pulse, relative to an unshaped reference pulse, is plotted as a function of the relative delay time between the two pulses. The shaped pulse resulted from a linear spectral phase with 2 ps slope applied by the 2D modulator as previously described without any deflection of the shaped pulse in the vertical direction. Modulator replica pulses were observed at −4, 0, 2 and 4 ps. The present embodiment employs an optically addressed liquid crystal 2D spatial light modulator, and replica pulses are larger for this device than they would be with other modulators such as a standard electrically addressed transmissive liquid crystal 1D spatial light modulator, since the 2D modulator employed has rather smooth pixel boundaries.

Figure 5B:
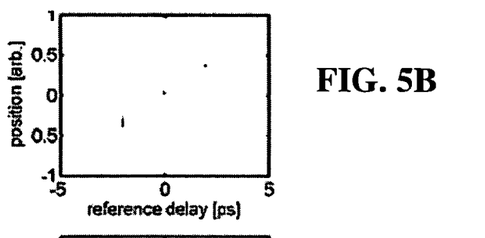

FIG. 5B is a plot of spatially resolved cross-correlation intensity against interpulse delay time for a shaped pulse relative to a reference pulse, wherein the same linear spectral phase as in FIG. 5A was applied through diffraction-based 2D pulse shaping. The modulator replica pulses were distributed both in time and in space. In order to perform the spatially resolved cross-correlation measurement, the background-free cross-correlation signal generated in a β-barium borate crystal was imaged onto a CCD camera with a lens. Replica pulses may be removed, for example, by inserting a spatial aperture in place of the CCD camera. Since the replicas are displaced spatially and temporally from the output waveform, the aperture may be positioned to block the replicas and permit the output waveform to pass.

Figure 5C:
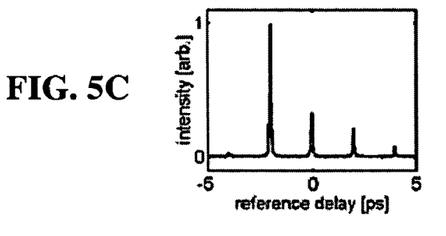

FIG. 5C is a plot of the spatially integrated cross-correlation signal of FIG. 5B as a function of interpulse delay time. The relative intensities in this plot were calculated by discrete summation over spatial regions of the CCD image of FIG. 5B which correspond to each replica pulse. As expected, the relative spatially integrated intensities of the replica pulses in the waveform arising from diffraction-based pulse shaping were similar to those obtained via standard non-diffractive, reflection-mode pulse shaping, as shown in FIG. 5A.

Figure 5D:
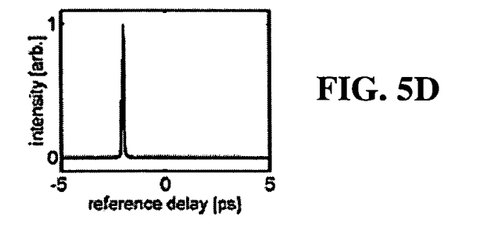

FIG. 5D is a plot of the cross-correlation intensity as a function of delay time for the output waveform of FIG. 5B, wherein a spatial filter was employed to block all light except that arising from the first-order diffracted beam. The spatial separation of the four replica pulses permitted efficient elimination of unwanted replica features though filtering, as evidenced by the clean single pulse profile observed in FIG. 5D.

A further capability of the 2D diffraction-based pulse shaping method and apparatus is the generation of multiple phase- and amplitude-shaped output waveforms. To demonstrate this, four regions of the two-dimensional mask, each including 60 horizontal rows of pixels, were used to generate four independently shaped output waveforms. The four regions of the 2D mask were adjusted to use the same vertical sawtooth phase profile, so that all four shaped output waveforms were incident upon the same first-order diffraction position at the plane 34, but with different angles of incidence. A spatial filter was used to block all but the first-order diffracted light at the focal plane. Alignment of the filter required care in order to block the unwanted diffraction orders while avoiding clipping the first-order beams, since clipping introduced weak cross-talk between the differently-shaped waveforms.

Figure 6A:
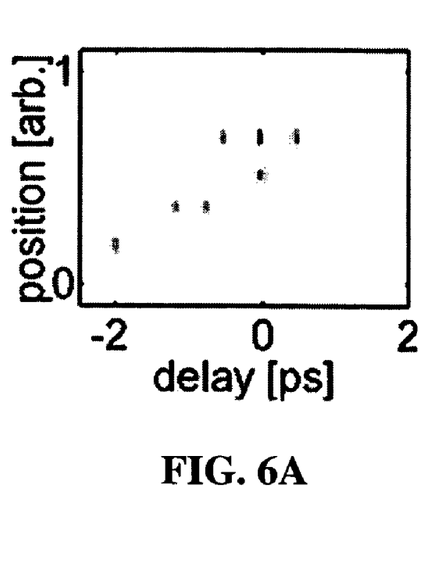
FIGS. 6A-B are plots of one- and two-dimensional cross-correlation intensities for an output waveform from the diffractive two-dimensional pulse shaper, showing multiplexed shaping of a single input pulse to create four independent output pulses in the first-order diffracted beam.

FIG. 6A is a plot of the angle resolved cross-correlation intensity of the four output waveforms as a function of a reference pulse delay time. The cross-correlation signals were measured by employing a lens of focal length f positioned at a distance f from focal plane 34 in order to map the angular distribution of the cross-correlation signal onto a CCD camera.

Figure 6B:
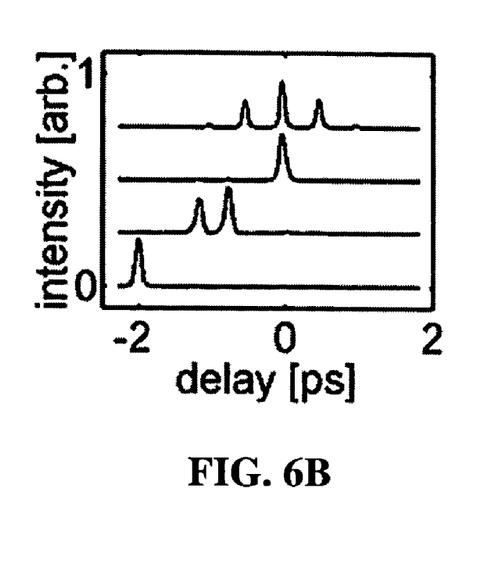

FIG. 6B is a plot showing horizontal slices taken through each of the four waveforms of FIG. 6A and encompassing the full range of reference pulse delay times. The one-dimensional scans show that the amplitude and phase of each of the four outputs was shaped independently of the others.

As described in one or more of the embodiments above, the use of a two-dimensional optical modulator in a diffractive configuration provides many advantages. For example, the two-dimensional modulator can be constructed as a single adjustable device with two orthogonal control axes, which eliminates many of the alignment difficulties encountered when operating separate one-dimensional modulators in tandem. Spatiotemporal control over an input waveform is possible and because the optical modulator can be either reflective or transmissive, a very wide range of operating wavelengths is possible. Since the modulator is configured to diffract the input waveform in at least one of the two modulation dimensions, spatial filtering of the waveform permits the elimination of many of the temporal replica features which are observed for pulses processed using more common one-dimensional non-diffractive pulse shaping methods. In addition, the diffractive configuration of the modulator ensures that even if the modulator's adjustable elements cannot individually provide a $2\pi$ phase shift at the wavelength of the input waveform, a complete $2\pi$ phase shift can still be achieved with some optical attenuation by preferentially selecting particular diffracted orders of the waveform. This greatly extends the useful operating frequency bandwidth of adaptive pulse shaping methods.

An alternative to the use of a liquid crystal-based device as a 2D modulator is to employ a two-dimensional deformable mirror, or a modulator based on piston-type reflective microelectromechanical systems (MEMS) technology. MEMS devices have high optical damage thresholds, relatively fast refresh rates of 0.01-1 ms, and wide spectral range. Reflective modulators provide two-dimensional control over only the phase of an input waveform, but configuration of the device in a diffractive geometry permits control over both spatial and temporal properties of the output waveform.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   directing an input EM waveform comprising a plurality of spatially overlapped frequency components to be incident on a dispersive optical element that disperses the dispersing frequency components along a first direction with each frequency component spatially extended along a second direction different from the first direction;
   setting an amplitude and a phase for an output portion of each of the spatially extended frequency components; and
   combining the output portions from the different frequency components to produce a temporally shaped output EM waveform,
   wherein setting the amplitude for the output portion of each frequency component comprises independently adjusting a subset of adjustable elements of a reconfigurable mask to selectively diffract the spatially extended frequency component into different diffraction orders; and
   wherein setting the phase comprises adjusting the mask such that a phase shift applied by the mask to at least some of the frequency components differs from a phase shift applied to at least some other frequency components among the spatially overlapped frequency components.

2. The method of claim 1, wherein setting the phase for the output portion of each frequency component comprises adjusting the mask such that the phase shift applied by the mask to each frequency component is different.

3. The method of claim 1, wherein the different diffraction orders comprise a zero diffraction order and at least one non-zero diffraction order.

4. The method of claim 3, wherein the output portions correspond to one of the non-zero diffraction orders.

5. The method of claim 4, further comprising blocking the EM radiation from the input portions diffracted into the zero diffraction order.

6. The method of claim 1, further comprising setting an amplitude for one or more additional output portions for each of the spatially extended frequency components, and combining all of the output portions to cause the output EM waveform to be temporally and spatially shaped.

7. The method of claim 6, wherein all of output portions are combined to produce the output EM waveform with a spatial profile corresponding to a spatial profile of the output portions along the second direction.

8. The method of claim 6, wherein all of the output portions are combined to produce the output EM waveform with a spatial profile corresponding to a Fourier transform of a spatial profile of the output portions along the second direction.

9. The method of claim 1, wherein patterns on the mask are used for the diffracting.

10. The method of claim 9, wherein the mask comprises an active area which imparts only phase modulation.

11. The method of claim 9, wherein the patterns on the mask are programmed by applying different electrical potentials to different regions of the mask.

12. The method of claim 9, wherein the mask comprises independent phase retarding elements extending along the first and second directions, and wherein each of the phase retarding elements is separately adjustable relative to the other phase retarding elements.

13. The method of claim 12, wherein multiple subsets of the phase retarding elements extending along the second direction are used to form the patterns that diffract the input portions.

14. The method of claim 13, wherein each subset forms a sawtooth diffraction grating pattern.

15. The method of claim 13, wherein the phase retarding elements are capable of phase retardation over a range less than $2\pi$, wherein a range of phase retardation of $2\pi$ comprises phase delays from zero to one wavelength, at the wavelength of the impinging waveform.

16. The method of claim 1, wherein the output EM waveform comprises spatially separated beams each comprising one or more temporal features shorter than 1 picosecond.

17. Apparatus comprising:
a mask;
input optics comprising beam-steering optics and a dispersive optical element, wherein the beam-steering optics are positioned to direct an input EM waveform comprising a plurality of spatially overlapped frequency components to be incident on the dispersive optical element, and the dispersive optical element is positioned to disperse the frequency components along a first direction of the mask with each of the frequency components spatially extended along a second direction of the mask different from the first direction; and
output optics positioned to combine output portions produced by the mask and produce a temporally shaped output EM waveform,
wherein the mask is configured to set an amplitude for each output portion by diffracting a corresponding input portion of each of the spatially extended frequency components along the second direction into different diffraction orders, wherein the combined output portions correspond to a common diffraction order; and
wherein the mask is configured to set a phase for each output portion by applying a phase shift to each of the frequency components, and wherein a first phase shift applied to at least some of the frequency components differs from a second phase shift applied to at least some other frequency components among the spatially overlapped frequency components.

18. The apparatus of claim 17, wherein the input optics and the output optics share one or more common elements.

19. The apparatus of claim 17, wherein the mask is further configured so that a different phase shift is applied to each of the frequency components.

20. The apparatus of claim 17, wherein the different diffraction orders comprise a zero diffraction order and at least one non-zero diffraction order.

21. The apparatus of claim 20, wherein the output portions correspond to one of the non-zero diffraction orders.

22. The apparatus of claim 21, further comprising a stop for blocking the EM radiation from input portions diffracted into the zero diffraction order.

23. The apparatus of claim 17, wherein the mask is further configured to set an amplitude for one or more additional output portions for each of the spatially extended frequency components, and the output optics are configured to combine all of the output portions to cause the output EM waveform to be temporally and spatially shaped.

24. The apparatus of claim 23, wherein the output optics are configured to combine all of the output portions to produce an output EM waveform with a spatial profile corresponding to a spatial profile of the output portions along the second direction.

25. The apparatus of claim 23, wherein the output optics are configured to combine all of the output portions to produce an output EM waveform with a spatial profile corresponding to a Fourier transform of a spatial profile of the output portions along the second direction.

26. The apparatus of claim 17, wherein the mask is configured to have diffractive patterns based on phase-only modulation.

27. The apparatus of claim 17, wherein the diffractive patterns on the mask are programmable by applying different electrical potentials to different regions of the mask, and wherein the apparatus further comprises an electronic controller coupled to the mask for programming the diffractive patterns.

28. The apparatus of claim 17, wherein the mask comprises independent phase retarding elements extending along the first and second directions, and wherein each of the phase retarding elements is separately adjustable relative to the other phase retarding elements.

29. The apparatus of claim 28, wherein multiple subsets of the phase retarding elements extending along the second direction are configured to form patterns that diffract the input portions.

30. The apparatus of claim 28, wherein the phase retarding elements are capable of phase retardation over a range less than $2\pi$, wherein a range of phase retardation of $2\pi$ comprises phase delays from zero to one wavelength, at the wavelength of the impinging waveform.

31. The apparatus of claim 17, further comprising a source providing the input EM waveform, wherein the input EM waveform comprises a coherent bandwidth greater than 1 THz.

32. The method of claim 1, further comprising directing a plurality of input EM waveforms, each comprising a plurality of spatially overlapped frequency components, to be incident on the dispersive optical element.

* * * * *